Dec. 12, 1950  J. A. VAN DEN BROEK  2,534,083
PROJECTOR
Filed April 18, 1946  4 Sheets-Sheet 1
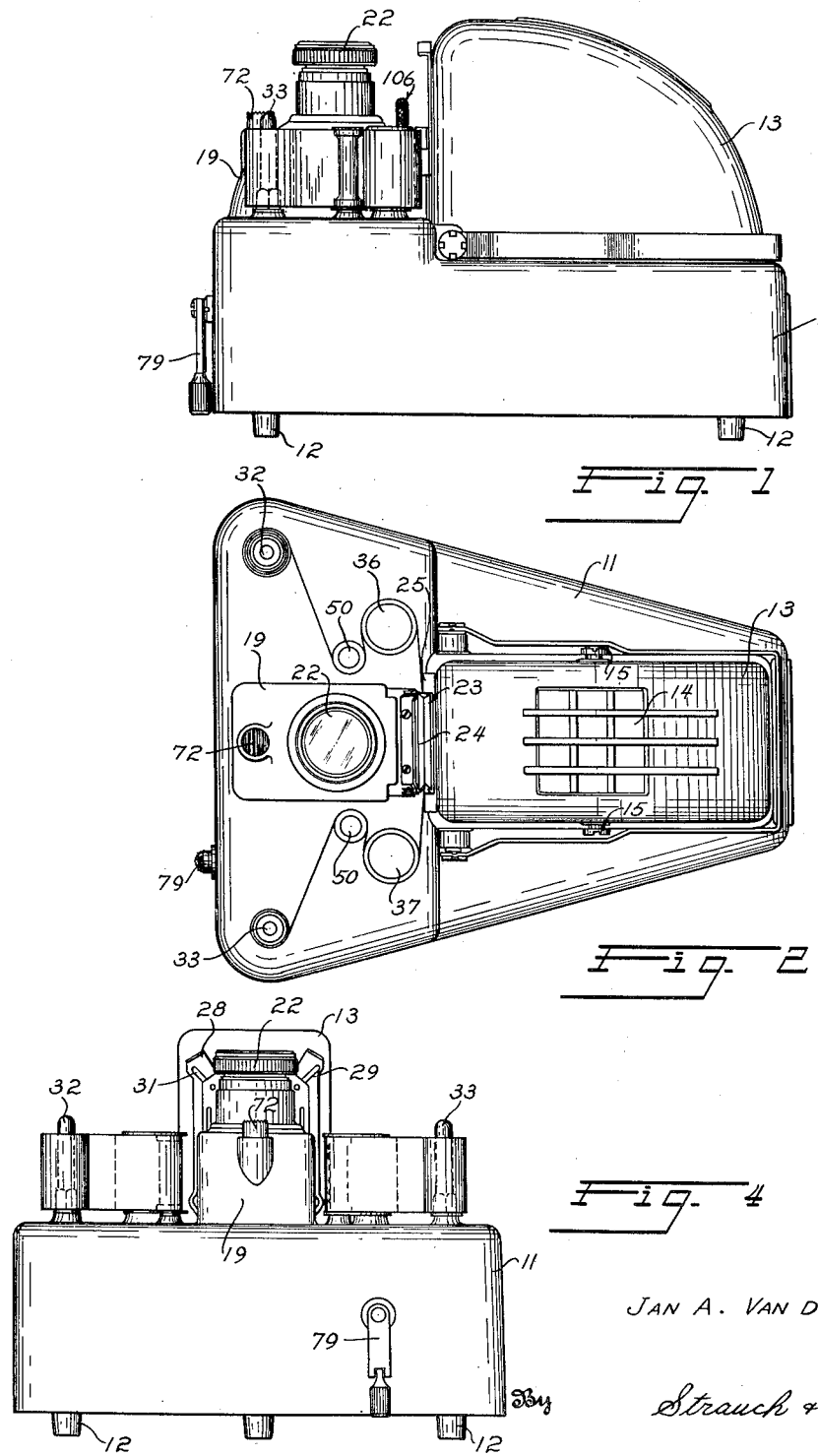
Inventor
JAN A. VAN DEN BROEK
Strauch & Hoffman
Attorneys Dec. 12, 1950    J. A. VAN DEN BROEK    2,534,083
PROJECTOR
Filed April 18, 1946    4 Sheets-Sheet 2
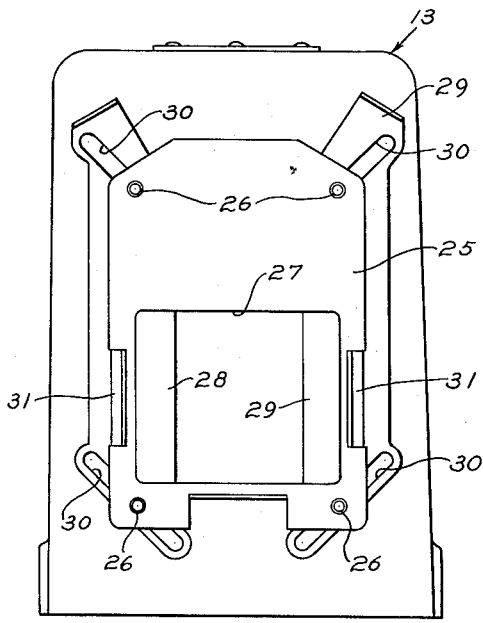
Fig. 3
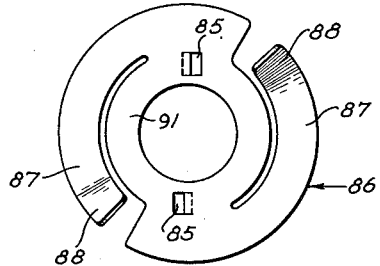
Fig. 9
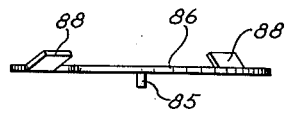
Fig. 11
Fig. 7
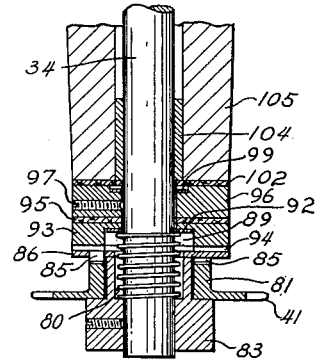
Fig. 8
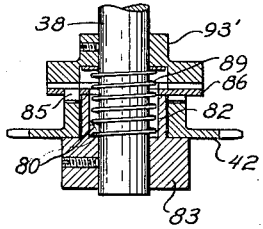
Fig. 10
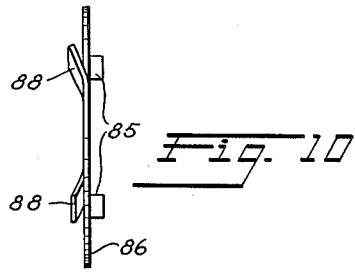
INVENTOR.
JAN A. VAN DEN BROEK
BY
Strauch & Hoffman
ATTORNEYS

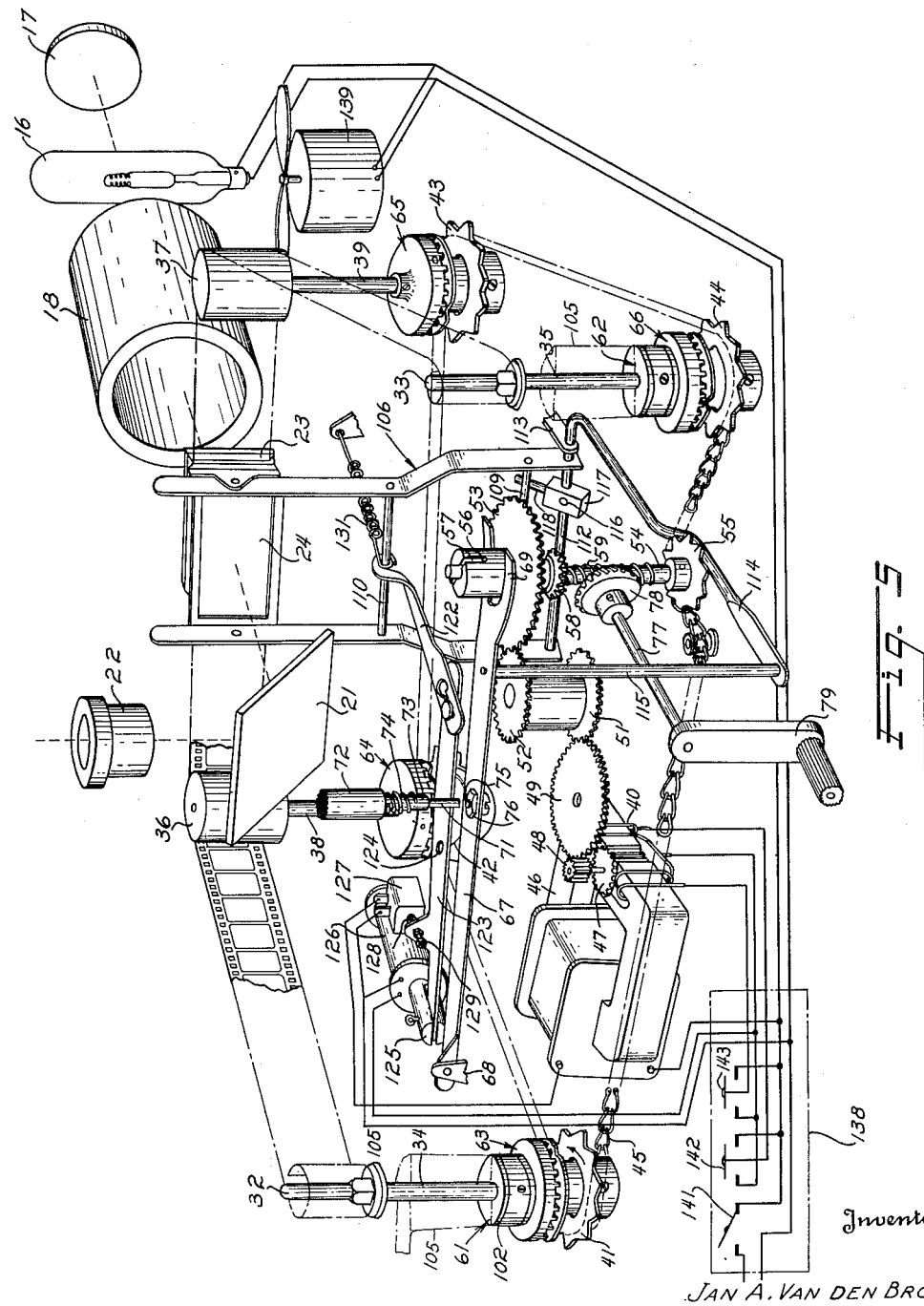

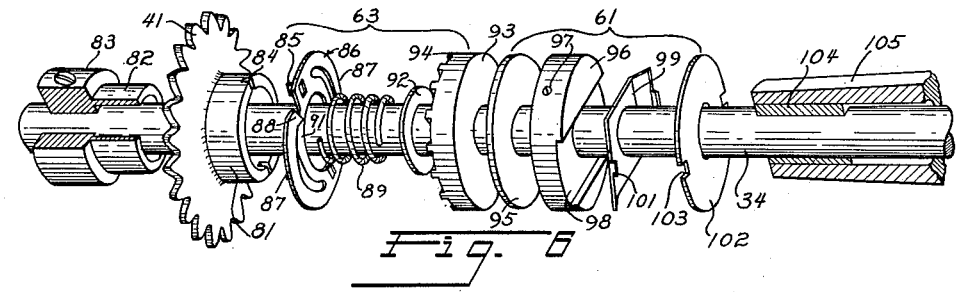
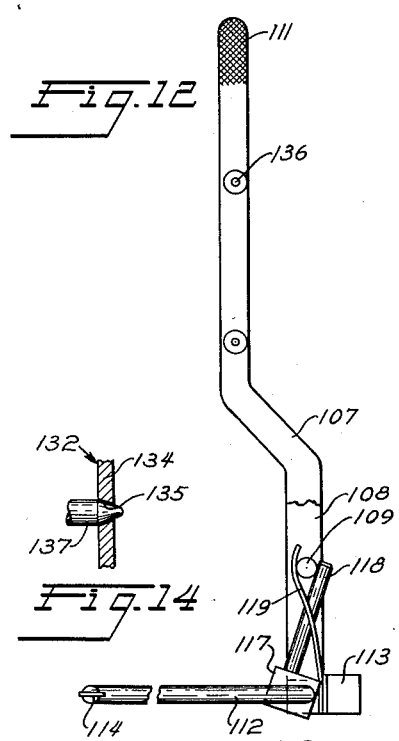
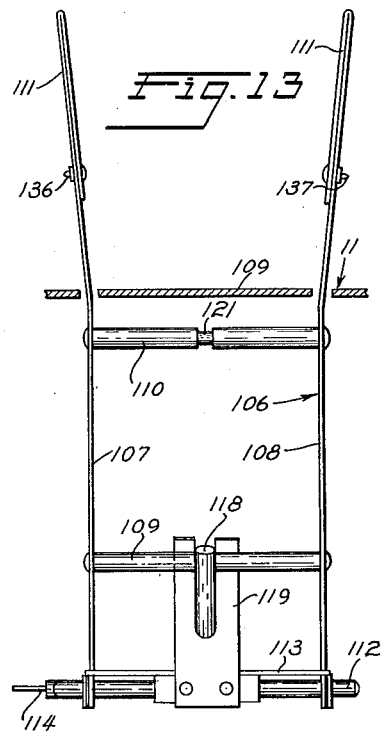
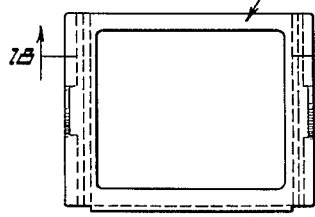
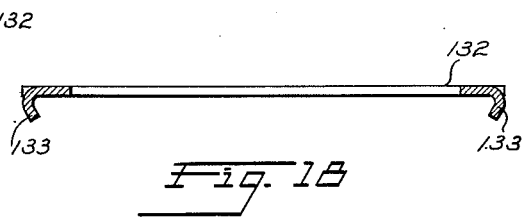

Patented Dec. 12, 1950

2,534,083

UNITED STATES PATENT OFFICE 2,534,083

PROJECTOR

Jan A. Van den Broek, Ann Arbor, Mich., assignor, by mesne assignments, to Bradfield and Bidwell, Inc., Ann Arbor, Mich., a corporation of Michigan Application April 18, 1946, Serial No. 663,135

2 Claims. (Cl. 88—24)

This invention relates to picture projection apparatus and is more particularly concerned with so-called "still" picture projection apparatus wherein a picture strip may be moved to selectively frame a picture in the optical path and maintain it there a desired length of time, as for reading and lecture purposes.

In its preferred embodiment the invention will be described as incorporated in a projector especially designed for ceiling projection, as for projecting microphotographed book pages on the ceiling of a room containing bedridden persons, but it will be understood that the film advancing and holding mechanism is not so limited.

It is a major object of the invention to provide a novel picture strip feed arrangement for controllably advancing a picture strip across an exposure aperture.

A further object of the invention is to provide a novel picture strip advancing and holding apparatus wherein the strip may be selectively moved in either direction across an exposure aperture and held in exposure position when movement ceases, together with means for automatically releasing the holding means when the strip is to be moved. Preferably in accomplishment of this object the holding means is released slightly in advance of actuation of movement of the film.

It is still a further object of the invention to provide a novel releasable presser plate assembly for holding the film flat at the exposure aperture in a projector and actuated in timed relation with movement of the film in either direction across the aperture.

A further object of the invention is to provide novel alternatively operable motor and manual arrangements for moving a picture strip in either direction across an exposure aperture in a projector or the like.

It is a further object of the invention to provide a reversible film drive, which may be optionably driven by motor and manual means, coupled in timed relation with a releasable film presser plate assembly at the exposure aperture in a projector.

A further object of the invention is to provide a novel pivoted frictional presser plate mounting on a shiftable support therefor whereby the film is held flat during projection.

A further object of the invention is to provide a novel shiftable support for releasably mounting a film presser plate.

A further object of the invention is to provide a novel reversible web drive apparatus for reversibly feeding a picture strip or like web between two reels and particularly novel slip clutch mechanism in the roll drive to compensate for changes in drive torque due to changing web roll diameters.

A further object of the invention is to provide novel one-way drive clutch arrangements in a film transport system.

Further objects of the invention will presently appear as the description proceeds in connection with the appended claims and the annexed drawings wherein:

Figure 1 is a side elevation of a ceiling projector embodying the invention;

Figure 2 is a top plan view of the projector of Figure 1 particularly illustrating the film feed path;

Figure 3 is a front elevation of the lamp house showing the masking plates mounted thereon;

Figure 4 is a front elevation of the projector of Figure 1;

Figure 5 is a substantially isometric view of the film feed and presser plate mechanisms according to a preferred embodiment of the invention and for incorporation in the projector of Figures 1 to 4;

Figure 6 is an exploded view of the one-way compensating drive clutch mechanism for each film roll shaft;

Figure 7 is a section through the one-way friction drive at the supply and take-up shafts for the film rolls;

Figure 8 is a section through the one-way clutch drive at the rubber feed rolls;

Figures 9, 10 and 11 are respectively top plan, side and end elevations of the spring ratchet used in the reversible drives;

Figure 12 is an enlarged side elevation of the swingable presser plate support;

Figure 13 is a front elevation of the presser plate support of Figure 12;

Figure 14 is an enlarged fragmentary sectional view illustrating the special conical frictional pivot connection between the presser plate and support of Figures 12 and 13;

Figure 15 is a front elevation of the pivoted presser plate support;

Figure 16 is an end elevation of the support of Figure 15;

Figure 17 is a bottom plan view of the support of Figures 15 and 16; and

Figure 18 is an enlarged sectional view along line 18—18 in Figure 15 illustrating the presser plate holding tabs.

Referring to Figures 1 to 4, the ceiling projector comprises a base 11 adapted to be levelly supported by legs 12 on a horizontal surface such as a table, bench or hospital floor. Rearwardly, a removable lamp housing 13, formed with a grilled ventilating air outlet 14 on top and releasably secured to base 11 as by screws 15, encloses a part of the optical system comprising an upright projection lamp 16 backed by a light concentrating reflector 17 which is optically aligned with the lamp filament and the axis of a condenser lens 18. Lamp 16, reflector 17 and lens 18 are suitably supported on base 11, and uncovered whenever lamp house 13 is removed.

Forwardly of lamp housing 13, base 11 is centrally provided with an upstanding hollow objective lens mount 19 internally containing a plane reflector 21 and an objective lens assembly 22 having a vertical optical axis perpendicular to and coplanar with the optical axis of condenser 18. Lamp housing 13 and lens mount 19 are both apertured in alignment with condenser 18 to permit the projection light path.

Interposed in the light path between lens 18 and reflector 21 are two presser plates 23 and 24 having their adjacent faces perfectly flat and parallel in vertical planes. Plates 23 and 24 are preferably blocks of glass or like rigid light-transparent material.

Rear presser plate 23 is fixedly mounted on lamp house 13. Lamp house 13 has its front wall apertured in alignment with the optical axis, the aperture being of a size at least equal to the largest picture size to be positioned between plates 23 and 24. Referring to Figure 3, a suitable presser plate mounting plate 25 is fixedly supported in spaced relation to the apertured front wall of lamp house 13, as by rivets 26. Plate 25 is formed with an aperture 27 in alignment with the optical axis and the larger aperture in the front wall of lamp house 13, this aperture being of dimension of the largest picture element that is to be projected. Vertical masking blades 28 and 29 formed with inclined cam and support slots 30 are mounted on rivets 26, being positioned mainly by friction in the space between plate 25 and the front wall of lamp housing 13. Adjustment of blades 28 and 29 controls the effective horizontal projection light aperture size to suit the picture dimensions so that variations in picture size on the film strip may be suitably compensated. Tabs 31 integral with plate 25 are bent over to clamp rear presser plate 23 (not shown in Figure 3) securely in the light path.

Front presser plate 24 is pivotably mounted on the swingable support illustrated in Figures 1, 12 and 13 as will appear.

The film transport system comprises generally supply and take up spool holders 32 and 33 fixed to vertical shafts 34 and 35, identical cylindrical feed rollers 36 and 37 surfaced with rubber or like high friction material and fixed to vertical shafts 38 and 39, and the film gate comprising plates 23 and 24. Idler rollers 50 as illustrated in Figure 2 are provided on upstanding vertical axes on base 11 between each feed roller and the film gate for guiding the film to contact a large portion of the peripheral surface of the feed rollers so as to insure a good positive friction drive of the film by the feed rollers. Sprockets 41—44 of identical size are provided on the vertical shafts of the film spools and feed rollers all driven by a common endless chain 45. A reversible electric motor 46 having a reversing winding 40 is mounted within base 11 and has its rotor 47 connected to drive chain 45 through gear 48 on the rotor shaft, idler gears 49, 51 and 52, gear 53, shaft 54, and a sprocket 55 engaged with chain 45.

Gear 53 is axially slidable with respect to shaft 54 and nonrotatably connected thereto, as by a pin 56 and slot 57 connection between the gear hub and shaft. Below gear 53, its hub has rigid therewith a bevel gear 58, and a coiled compression spring 59 surrounding shaft 54 reacts between the lower end of shaft 54 and gear 58 to normally bias slidable gear 53 into its illustrated upper position where it is in driving engagement with gear 52, a suitable stop being provided if desired to limit upward movement of gear 53. Thus, normally, when motor 46 is energized sprockets 41 to 44 are simultaneously rotated at the same peripheral speed and all in the same direction.

Sprockets 41 to 44 are respectively connected to shafts 34, 35, 38 and 39 by similar resilient toothed one-way drive clutch assemblies indicated at 63—66, and clutches 63 and 66 on the film supply and take-up shafts also include friction couplings 61 and 62 interposed between sprockets 41 and 44 and the respective shafts. The function of clutches 63—66 is to provide reversible positive drive for the film as will appear in the specific description of them given below. Friction couplings 61 and 62 are preferably identical, and the toothed drive clutch assemblies 63—66 are also substantially identical in structure as illustrated in Figures 6-8 and as will be described below.

Optionally with drive by motor 46, the film may be reversibly fed by manual operation. A lever 67, pivoted about a horizontal axis on a lug 68 rigid with base 11, is formed with a forked end 69 embracing the hub of gear 53. A vertical plunger 71, having its operating head 72 projecting upwardly through a suitable boss in lens mount 19, is slidable within a stationary sleeve 73 and biased upwardly by a coiled compression spring 74 so as normally to be slightly spaced from an abutment 75 on lever 67. Spring 74 is mainly housed by head 72. Abutment 75 is preferably a screw locked by a nut 76 in such adjusted position as to cooperate best with plunger 71. A horizontal shaft 77 is suitably journalled in base 11 with a bevel gear 78 fixed upon its inner end and a handle 79 affixed thereto outside base 11.

When the operator desires to move the film manually instead of by motor 46, he depresses plunger 71, thereby rocking lever 67 downwardly and disengaging gears 52 and 53, and engaging bevel gears 58 and 78 so that rotation of handle 79 will rotate sprocket 55 to drive chain 45. Upon release of head 72, springs 59 and 74 force the parts to the motor drive position illustrated in Figure 5.

With reference to Figures 6 and 7, the drive connections between sprocket 41 and shaft 34 are there illustrated. Sprocket 41 is formed with a boss 81 which is freely rotatably supported upon a bearing 82 rigid with a collar 83 which is secured to shaft 34 as by a set screw. Shaft 34 is suitably rotatably supported within the upper part of base 11 so that the drive assembly is mounted on its depending end. The elongated hub of sprocket 41 is provided with diametrically opposite, upwardly open slots 84 adapted to receive lugs 85 integrally bent out of the plane of an angular spring metal ratchet disc 86 which is thereby non-rotatably secured to sprocket 41.

Disc 86 is arcuately slotted to provide thereon a pair of circumferentially extending spring fingers 87 lying mainly in the plane of the disc but provided at their outer ends with downwardly bent projections or teeth 88 which are diametrically opposite but are similarly projecting circumferentially as best illustrated in Figures 9–11.

A coiled compression spring 89 surrounds shaft 34, and extends within a central recess 80 in collar 83 reacting between collar 83 and a loose washer 92 adapted to be seated at the bottom of a cup-shaped annular toothed ratchet member 93 deep enough to enclose the compressed spring. Member 93 is formed on its cylindrical wall with downwardly projecting teeth 94 adapted to coact with one or the other of resiliently mounted teeth 88 depending on the direction of rotation of sprocket 41. Cup 93 is apertured centrally to loosely pass shaft 34 therethrough.

Above cup 93, shaft 34 is loosely surrounded by an annular flat friction element 95 adapted to be contacted on opposed flat sides by the flat top of cup 93 and the flat bottom of a coupling block 96 secured to shaft 34 as by set screw 97. Block 96 is diametrically grooved at 98 to provide a recessed seat for a leaf spring element 99 having outwardly bent ends terminating in axially disposed lugs 101. A second annular friction element 102 is formed at diametrically opposite points with peripheral notches 103 adapted to interfit with spring lugs 101 in assembled position, and is interposed between the flat upper side of block 96 and the flat end of a support boss 105 which depends rigidly from the upper part of base 11 and carries a shaft bearing 104.

In operation when sprocket 41 is rotated counterclockwise as indicated by the arrow in Figure 5, teeth 88 of disc 86 positively engage the teeth 94 of cup 93 to rotate cup 93 in the same direction, and since axially movable cup 93, friction element 95 and block 96 are urged into tight frictional contact by the expanding spring 89, cup 93 in turn drives shaft 34 counterclockwise winding film on the supply spool.

When sprocket 41 is rotated clockwise in Figure 5, resiliently mounted teeth 88 merely slide over teeth 94 and cup 93 is held stationary through friction element 95 and spring 89, so that shaft 34 is not positively driven.

The drive mechanism on shaft 35 between sprocket 44 and shaft 35 is preferably the same as that illustrated in Figure 7, the difference, however, being that teeth 88 of the ratchet disc 86 used on shaft 35 face opposite to those on the ratchet disc on shaft 34, so that when sprocket 44 is rotated clockwise it positively drives shaft 35 whereas when it is rotated counterclockwise it does not drive shaft 35.

Figure 8 illustrates the drive mechanism mounted on the lower end of feed roller shaft 38. There collar 83 which rotatably supports the sprocket is affixed to shaft 38 as by a set screw and spring ratchet disc 86 is interposed between sprocket 42 and the toothed cup-shaped member 93′ which is like cup 93 except that cup 93′ is rigidly secured to shaft 38 as by a set screw. Thus the drive connection between sprocket 42 and shaft 38 is simply a one-way clutch omitting the friction coupling elements of the supply and take-up drives.

The drive connection between sprocket 43 and shaft 39 is structurally identical with that for the other feed roller except that teeth 88 are oppositely disposed in the two drives so that when only one feed roller 36 or 37 is positively driven when chain 45 is moved in one direction and only the other feed roller is positively driven when chain 45 is oppositely moved.

The relative one-way drive clutch arrangements in the projector are such that when the film is to be moved from the supply spool 32 to the take-up spool 33 in Figure 5, chain 45 is driven counterclockwise in Figure 5 to thereby positively drive shafts 35 and 39, shafts 34 and 38 being relatively idle and non-driven by reason of their one-way clutch assembly structure. Thus film is fed past the exposure aperture at a constant speed by feed roller 37, and is accumulated on the driven take-up spool at 33. As film is withdrawn from the idling supply spool at 32 any tendency of the latter to overrun and discharge loose film into the machine is overcome by the braking action of friction disc 102 between shaft 34 and boss 105. Furthermore, as the roll of film on take-up spool 33 increases in diameter it tends to demand more film than is supplied by the constant speed feed of roller 37. As a result the film tension increases between roller 37 and the take-up spool but friction coupling 95 here functions to provide sufficient slippage in the take-up spool drive to correlate it to the film feed speed of roller 37.

When chain 45 is driven clockwise in Figure 5, only shafts 34 and 38 are positively driven and film is fed from right to left in Figure 5 by roller 36 to be wound upon the driven supply spool, thus exactly reversing the above described operation in all respects.

Movable pressure plate 24 is mounted on a swingable frame 106 best illustrated in Figures 5 and 12–18. Provision is made for automatically separating plates 23 and 24 to release and permit movement of the film whenever the film drive is actuated either manually or by motor 46. I have also arranged to separate plates 23 and 24 a short time prior to each driven movement of the film so as to synchronize the film release and drive means and thereby insure against injury to the film.

Support 106 comprises parallel vertical arms 107 and 108 maintained together in spaced relation by rigid cross bars 109 and 110 below the top wall 109 of base 11 as illustrated in Figure 13. As also illustrated in Figure 13, arms 107 and 108, which are strips of flexible metal, are divergingly bent at a point just above their fixed interconnection at bar 110 and are provided with knurled outer surfaces 111 (Figure 6) adapted to be gripped by an operator's fingers for a purpose to appear.

Support frame 106 at its lower end is rotatably supported on a horizontal cross rod 112 which in turn is rotatably journaled on the spaced legs of a U-shaped bracket 113 suitable rigidly mounted on base 11. Rod 112 is provided with a forwardly extending portion 114 secured at its front end to an upright member 115 depending rigidly from lever 67, so that, when lever 67 is rocked downwardly by depression of plunger 71, rod 112 is concomitantly rocked counterclockwise in Figure 5. Rigidly secured to rod 112, as by set screw 116, is a block 117 carrying a pin 118 adapted to contact cross bar 109. Support frame 106 is resiliently biased clockwise (toward closed portion of the plates 23 and 24) by a spring leaf 119 riveted at one end to stationary bracket 113 and bearing at its upper end against bar 109 on the opposite side from pin 118 as illustrated in Figure 12. Spring 119 is bifurcated to permit relative movement with pin 118.

Thus, when rod 112 is rocked by depression of plunger 71, contact of pin 118 with bar 109 rocks support frame 106 clockwise about the axis of rod 112 in Figure 5 against the bias of spring 119, and spring 119 returns the frame when the plunger is released. This is a manual arrangement for separating the presser plates 23 and 24 at the time the manual drive is established.

Cross bar 110 is formed with a groove 121 over which is hooked the end of an arm 122 pivoted to an actuating lever 123 which in turn is intermediately pivoted about a vertical axis pivot 124 stationary with respect to base 11 and pivotally connected at its further end to the reciprocable armature 125 of a solenoid 126. A normally open control switch 127 is mounted in the field circuit of motor 46. A switch button 128 of switch 127 is located for abutment by an adjustable stop screw 129 carried by lever 123 for control synchronization as will appear. Frame 106 is biased toward closed position of plates 23 and 24 by a tension spring 131 anchored to base 11 at one end and attached to bar 110 at its other end, so that during all periods when solenoid 126 is de-energized and plunger 71 released, spring 131 holds the film presser plates closed tightly.

Plate 24 is rigidly clamped in a sheet metal frame 132 (Figures 15–18) having inturned side and bottom flanges 133 bent over the beveled edges of plate 24. At opposite sides, frame 132 is provided with integral parallel tabs 134 bent forwardly at right angles to the planar surface of plate 24 and formed with aligned circular apertures 135. As illustrated in enlarged fashion in Figure 14, apertures 135 are each of outwardly diverging conical form and are adapted to frictionally fit over similarly shaped conical support and pivot pins 136 and 137 on arms 107 and 108 respectively.

In order to mount frame 132 on support 106, the operator grips knurled portions 111 between his thumb and forefinger to flex the upper ends of arms 107 and 108 toward each other and decrease the distance between pins 136 and 137 until tabs 134 can be slipped past the outer ends of the latter to align apertures 135 with the pins. Then the resilient arms 107 and 108 are released permitting them to flex outwardly expandingly and insert pins 136 and 137 into apertures 135 and thus hold frame 132 on a frictional pivot on support 106. The top of frame 132 is open to permit insertion or removal of glass plate 24.

Frame 132 is thus swingably mounted about a horizontal axis parallel to the film path. The resilient biasing force of arms 107 and 108 and the conical pivot surfaces coact to provide a friction pivot connection such that, when the plate 24 is initially swung to clamp a film between it and plate 23, plate 24 assumes a position parallel to plate 23 and is retained there by the friction at the pivots. This arrangement also provides for ready removal and replacement of plate 24 in addition to the automatic alignment feature.

The usual 110-volt power line is connected through a selector switch assembly 138 to motor 46, solenoid 126, switch 127, lamp 16 and a motor 139 driving a fan for the lamp cooling system.

In switch assembly 138, a first snap switch 141 is adapted to immediately close the circuits of lamp 16 and fan motor 139. Normally open push button switches 142 and 143 control operation and direction of the film feed at the operator's will and these switches are energized when switch 141 is closed. When switch 142 is closed, the circuits of solenoid 126 and one side of reversing winding 40 are closed, and the circuit of motor 46 is closed except for switch 127. Energization of solenoid 126 retracts armature 125 to rock lever 123, which through arm 122 rocks support 106 and plate 24 to release the film at the aperture. The spacing of abutment 129 and switch button 128 is such that switch 127 is not closed until plates 23 and 24 are appreciably separated so that motor 46 which starts when switch 127 is closed does not start to drive the selected film spool and feed roller until after the film has been released at the film gate. Switch 143 effects the same control as switch 142 except that it energized the other side of the reversing winding 40 and causes movement of the film opposite to that effected by switch 142.

In practice, switch assembly 138 is a unit connected to the projector by a flexible cord so that a patient, for example, in a hospital bed may, with the projector on the floor beside him, control movement and direction of the film simply by manipulating buttons at 142 and 143 after switch 141 has been turned to ON position.

Switch 127 thus provides for automatic sequential opening of the film gate and actuation of the film drive when motor 46 is the source of power. When the film is manually driven, this sequential operation is obtained by the action of pin 118 contacting bar 109 to rock support 106 to open the film gate whenever plunger 71 is depressed and the parts are so constructed that this is accomplished before gears 58 and 78 are meshed.

My invention provides a novel projector wherein the film strip is reversibly driven at the will of the operator, and wherein either motor or manual means is available for such drive. The film is fed at constant speed across the exposure aperture by suitable friction feed rollers, and provision is made at the film roll holding spools for compensating for changing film roll diameters so as not to unduly tension or loosely deliver the film.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a ceiling projector, a mechanism housing, or removable lamp house on said mechanism housing, an objective lens assembly upstanding from said housing on a vertical axis, a pair of separable flat transparent plates providing a film gate on the top of said housing in a vertical plane adjacent and in the optical path of said lens assembly, one of said plates being mounted on said lamp house, film spools rotatable on vertical axes on opposite sides of said film gate on the top of said housing, means in said housing operable for selectively driving one or the other of said spools for reversible feed of said film, and means in said housing synchronized with said film feed means for separating said plates during film movement.

2. In a projector having an aperture before which a picture to be projected is positioned, electric motor driven means for feeding a film past said aperture, releasable means for holding the film at said aperture during projection, a control switch in the motor circuit, and means for sequentially releasing said holding means and feeding the film past said aperture comprising a member movable to release said holding means adapted to close said switch only after predetermined movement of said member.

JAN A. VAN DEN BROEK.

REFERENCES CITED

The following references are of record in the file of this patent:

UNITED STATES PATENTS

| Number | Name | Date |
|---|---|---|
| 1,210,955 | Langheck | Jan. 2, 1917 |
| 1,350,548 | Darby | Aug. 24, 1920 |
| 1,824,519 | Victor | Sept. 22, 1931 |
| 1,874,953 | Franzen et al. | Aug. 30, 1932 |
| 1,879,600 | Burchett | Sept. 27, 1932 |
| 2,008,982 | Hopkins | July 23, 1935 |
| 2,113,578 | Draeger | Apr. 12, 1938 |
| 2,165,419 | Schubert | July 11, 1939 |
| 2,177,638 | Schubert | Oct. 31, 1939 |
| 2,231,765 | Landrock | Feb. 11, 1941 |
| 2,279,463 | Hopkins | Apr. 14, 1942 |
| 2,377,476 | Berglund | June 5, 1945 |

Certificate of Correction

Patent No. 2,534,083                                December 12, 1950

JAN A. VAN den BROEK

It is hereby certified that error appears in the printed specification of the above numbered patent requiring correction as follows:

Column 8, line 57, for the words "or removable" read *a removable*;

and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*